(12) United States Patent
Chen et al.

(10) Patent No.: US 8,601,316 B2
(45) Date of Patent: Dec. 3, 2013

(54) POWER SUPPLY SYSTEM

(75) Inventors: Kai-Fu Chen, New Taipei (TW);
Chia-Yun Lee, Tu-Cheng (TW);
Chuang-Wei Tseng, Tu-Cheng (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 375 days.

(21) Appl. No.: 13/043,628

(22) Filed: Mar. 9, 2011

(65) Prior Publication Data

US 2012/0179929 A1 Jul. 12, 2012

(30) Foreign Application Priority Data

Jan. 11, 2011 (TW) ................................. 100100926

(51) Int. Cl.
*G06F 11/07* (2006.01)
(52) U.S. Cl.
USPC ................................. 714/14; 714/22; 714/24
(58) Field of Classification Search
USPC ................................................. 714/14, 22, 24
See application file for complete search history.

(56) References Cited

U.S. PATENT DOCUMENTS

| | | | |
|---|---|---|---|
| 3,818,128 A * | 6/1974 | Chambers et al. | 348/730 |
| 2003/0168913 A1* | 9/2003 | Kinnard | 307/29 |
| 2006/0109074 A1* | 5/2006 | Lee et al. | 337/167 |
| 2006/0193094 A1* | 8/2006 | Korsten et al. | 361/62 |
| 2008/0052505 A1* | 2/2008 | Theobald | 713/1 |
| 2008/0120520 A1* | 5/2008 | Eriksson | 714/25 |
| 2009/0102618 A1* | 4/2009 | Iwai | 340/310.11 |
| 2009/0150100 A1* | 6/2009 | Pifer et al. | 702/62 |
| 2009/0213515 A1* | 8/2009 | Phillips et al. | 361/93.2 |
| 2009/0271559 A1* | 10/2009 | Driehorn et al. | 711/103 |
| 2009/0310390 A1* | 12/2009 | Ohshima et al. | 363/71 |
| 2010/0027180 A1* | 2/2010 | Bingel et al. | 361/93.9 |
| 2010/0058094 A1* | 3/2010 | Miyazaki et al. | 713/340 |
| 2010/0066484 A1* | 3/2010 | Hanwright et al. | 340/3.44 |
| 2010/0321852 A1* | 12/2010 | Smith et al. | 361/160 |
| 2011/0148423 A1* | 6/2011 | Richards et al. | 324/424 |
| 2011/0169470 A1* | 7/2011 | Itakura | 323/282 |
| 2012/0033338 A1* | 2/2012 | Van Leeuwen et al. | 361/62 |
| 2012/0229937 A1* | 9/2012 | Ramamurthy et al. | 361/18 |
| 2013/0200725 A1* | 8/2013 | Apelker et al. | 307/117 |

* cited by examiner

*Primary Examiner* — Chae Ko
(74) *Attorney, Agent, or Firm* — Altis Law Group, Inc.

(57) ABSTRACT

A power supply system includes a power supply unit, a number of electrical loads and a sequence circuit. The power supply unit provides power for the electrical loads through the sequence circuit. When any one of the electrical loads fails the sequence circuit will record the failure, shut down and lock the power supply unit to prevent the power supply unit from powering the electrical loads.

8 Claims, 2 Drawing Sheets

POWER SUPPLY SYSTEM

TECHNICAL FIELD

The disclosure generally relates to a power supply system, and more particularly to a power supply system with auto protection.

DESCRIPTION OF RELATED ART

A power supply system is an important part of an electronic product. For example, in a computer system, a power supply unit provides power for electrical loads such as central processing units (CPUs), hard disk drivers (HDDs) or random-access memories (RAMs). Generally, each electrical load has a protecting circuit for shutting down the power supply unit when the electrical load fails. However, the protection circuit does not lock the power supply unit. If users star the power supply system again, defective elements in the electrical load may get burned out or cause further damage.

Therefore, an improved power supply system is desired to overcome the above described shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments of the present disclosure will now be described in detail below and with reference to the drawings.

Figure 1:
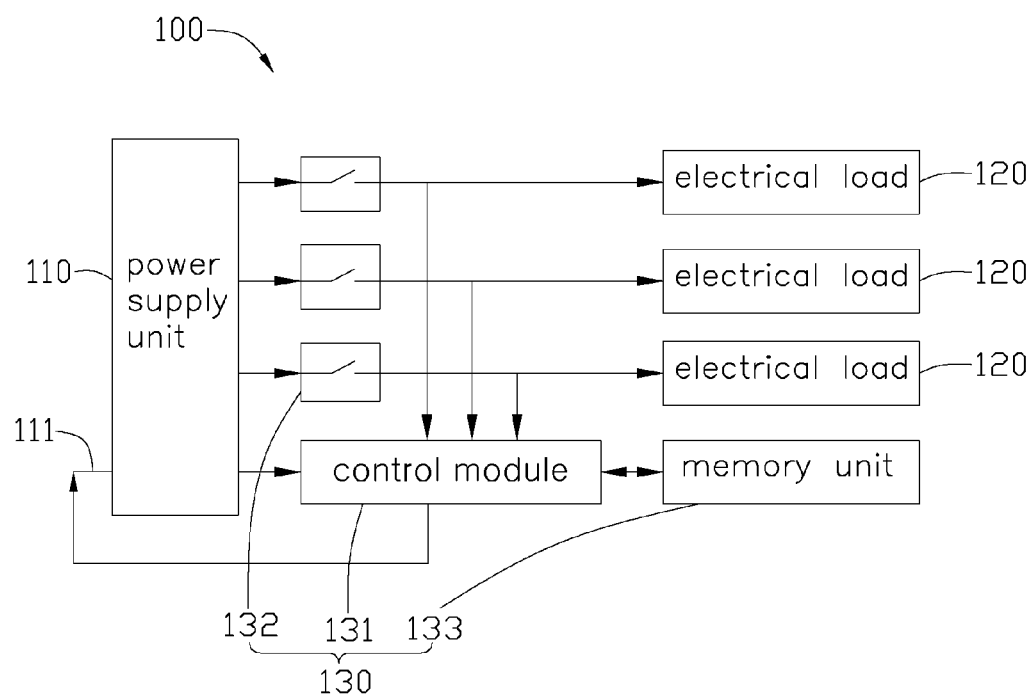
FIG. 1 is an illustrative view for a power supply system in accordance with a first embodiment.

Referring to FIG. 1, a power supply system 100 according to a first embodiment is shown. The power supply system 100 includes a power supply unit 110, a plurality of electrical loads 120 and a sequence circuit 130.

The power supply unit 110 can be electrically connected to an external power source. The power supply unit 110 can include an AC-DC rectifier for rectifying an AC current of the external power source to DC current, thereby supplying DC current to the electrical loads 120. The power supply unit 110 can further include a control terminal 111. The control terminal 111 is electrically connected with the sequence circuit 130 for recording the default in the electrical loads 120.

The electrical loads 120 can be selected from the group consisting of central processing units (CPUs), hard disk drivers (HDDs), random-access memories (RAMs) and main boards.

The sequence circuit 130 is configured for selectively powering the electrical loads 120. The sequence circuit 130 includes a control module 131 and a plurality of switch units 132. Each of the switch units 132 is electrically connected between the power supply unit 110 and one electrical load 120. The control module 131 is configured for controlling the status of the switch units 132. For example, if the control module 131 turns on the switch units 132, the power supply unit 110 will provide power for the electrical loads 120. Likewise, if the control module 131 turns off the switch units 132, the power supply unit 110 will stop providing power for the electrical loads 120. In addition, the sequence circuit 130 further acts as a default detecting device. When a failure such as short-circuit or open circuit happen in any one of the electric loads 120, the sequence circuit 130 will record the failure, shut down and lock the power supply unit 110. The locking of the power supply unit 110 means that, even if a user presses a start button to turn on the power supply unit 110, the power supply unit 110 cannot provide power to the electrical loads 120. Therefore, if any one of the electrical loads 120 is in fault condition, the power supply unit 110 does not provide power for the electrical loads 120, avoiding further damage to the electrical loads 120 which have failed. The control module 131 further includes a memory unit 133 for determining whether a default has happened in any one of the electrical loads 120. The memory unit 133 stores a first data "0" when the electrical loads 120 are in normal condition and stores a second data "1" when any one of the electrical loads 120 has failed. By detecting the data stored in the memory unit 133, the control module 131 can determine whether to turn on the switch units 132 for providing power for the electrical loads 120. The memory unit 133 can be a nonvolatile memory device. Even if the whole power supply system 100 shuts down and loses power, the memory unit 133 will not lose the stored data.

The power supply system 100 works in the following manner. When a user presses a start button to turn on the power supply system 100, the power supply unit 110 first provides power to the sequence circuit 130. At that time, each switch unit 132 is off and the power supply unit 110 is disconnected from the electrical loads 120. Then, the control module 131 will detect the data stored in the memory unit 133. If the memory unit 133 stores the first data "0", the control module 131 will turn on the switch unit 132 for providing power for the electric loads 120. If the memory unit 133 stores the second data "1", the control module 131 will shut down the power supply unit 110. Therefore, when any one of the electric loads 120 is in default condition, the power supply unit 110 cannot continue to provide power for the electrical loads 120 even if a user presses the start button again. Accordingly, the user has to send the electrical product with that power supply system 100 to a maintenance department or return it to the manufacturer. Once the maintenance engineers find out what has happened in the power supply system 100 and repair it, the maintenance engineers will reset the memory unit 133 to store the first data "0". So that the electric product with the power supply system 100 will start to work properly.

Figure 2:
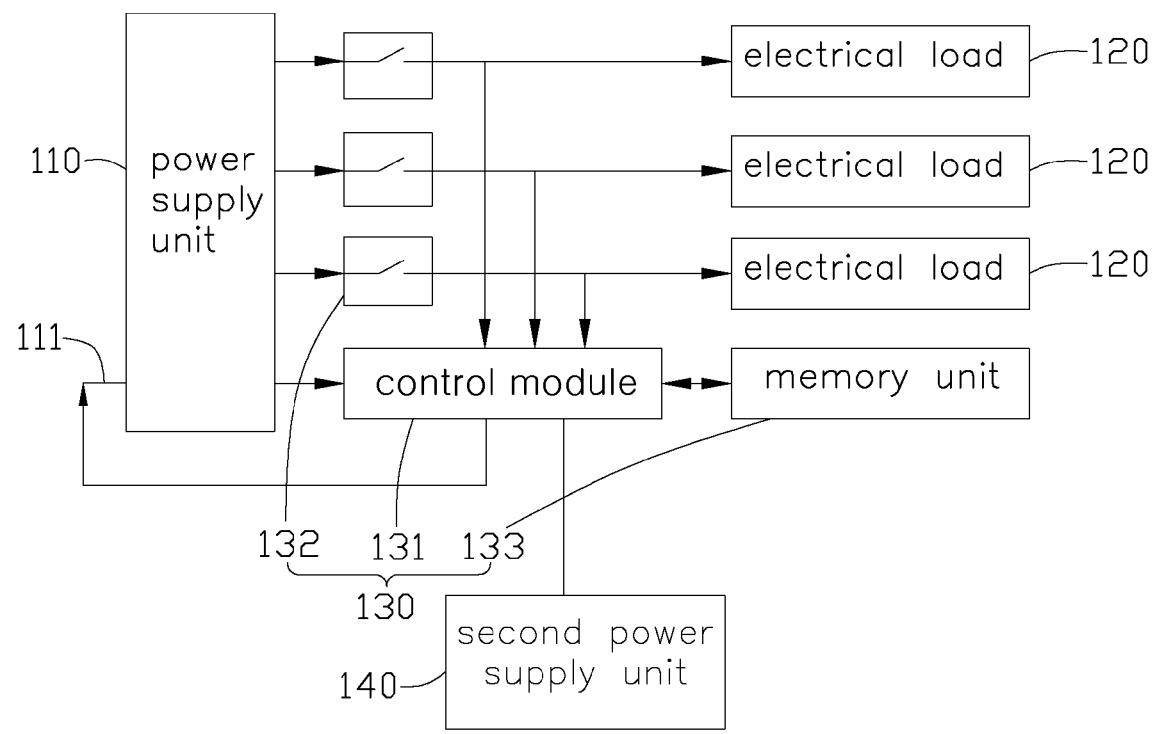
FIG. 2 is an alternative embodiment of a power supply system.

Referring to FIG. 2, in an alternative embodiment, the power supply system 100 can further include a second power supply unit 140. The second power supply unit 140 provides power for the sequence circuit 130 instead of the power supply unit 110. Therefore, when any one of the electrical loads 120 fails, the sequence circuit 130 will shut down and lock the power supply unit 110. However, even if the power supply unit 110 is shut down, the sequence circuit 130 is still working and locking the power supply unit 110. Thus, the power supply unit 110 cannot be turn on and cannot continue to provide power to the electrical loads 120.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A power supply system, comprising:
a plurality of electrical loads;
a power supply unit being configured for providing power for the electrical loads; and
a sequence circuit powered by the power supply unit, the sequence circuit being configured for selectively powering the electrical loads;
wherein when failures happen in any one of the electrical loads, the sequence circuit will record the failure, shut down and lock the power supply unit for preventing the power supply unit to continue to power the electrical loads;
wherein the sequence circuit comprises a control module and a plurality of switch units, the switch units are connected between the power supply unit and the electrical loads, and the control module is configured for controlling statuses of the switch units; and
wherein the sequence circuit further comprises a memory unit, the memory unit stores a first data when the electrical loads are in normal condition and stores a second data when failures happen in any one of the electrical loads, when the power supply system start, the control module first detect the data stored in the memory unit, if the memory unit has stored the first data, the control module will turn on the switch units to provide power for the electric loads, if the memory unit has stored the second data, the control module will shut down the power supply unit.

2. The power supply system of claim 1, wherein the memory unit is a nonvolatile memory device.

3. The power supply system of claim 1, wherein the electrical loads are selected from the group consisting of central processing units, hard disk drivers, random-access memories and main boards.

4. The power supply system of claim 1, wherein the power supply unit further comprises a control terminal, and the control terminal is connected with the sequence circuit and records failures in the electrical loads.

5. A power supply system, comprising:
a plurality of electrical loads;
a first power supply unit being configured for providing power for the electrical loads:
a sequence circuit being configured for selectively powering the electrical loads; and
a second power supply unit being configured for providing power for the sequence circuit;
wherein when failures happen in any one of the electrical loads, the sequence circuit will record the failure, shut down and lock the first power supply unit for preventing the first power supply unit to continue to power the electrical loads;
wherein the sequence circuit comprises a control module and a plurality of switch units, the switch units are connected between the first power supply unit and the electrical loads, and the control module is configured for controlling statuses of the switch units; and
wherein the sequence circuit further comprises a memory unit, the memory unit stores a first data when the electrical loads are in normal condition and stores a second data when failures happen in any one of the electrical loads, when the first power supply system start, the control module first detect the data stored in the memory unit, if the memory unit has stored the first data, the control module will turn on the switch units to provide power for the electric loads, if the memory unit has stored the second data, the control module will shut down the first power supply unit.

6. The power supply system of claim 5, wherein the memory unit is a nonvolatile memory device.

7. The power supply system of claim 5, wherein the electrical loads are selected from the group consisting of central processing units, hard disk drivers, random-access memories and main boards.

8. The power supply system of claim 5, wherein the first power supply unit further comprises a control terminal, and the control terminal is connected with the sequence circuit and records the happening of failures in the electrical loads.

* * * * *